US008488787B2

(12) United States Patent  
Charbonnier et al.

(10) Patent No.: US 8,488,787 B2
(45) Date of Patent: Jul. 16, 2013

(54) MANAGEMENT OF SECURE ACCESS TO A SECURE DIGITAL CONTENT IN A PORTABLE COMMUNICATING OBJECT

(75) Inventors: Emilien Charbonnier, La Cadiere d'Azur (FR); Frederic Faure, Cassis (FR)

(73) Assignee: Gemalto SA, Meudon (FR)

( * ) Notice: Subject to any disclaimer, the term of this patent is extended or adjusted under 35 U.S.C. 154(b) by 611 days.

(21) Appl. No.: 12/279,289

(22) PCT Filed: Feb. 23, 2007

(86) PCT No.: PCT/EP2007/051752
§ 371 (c)(1),
(2), (4) Date: Aug. 13, 2008

(87) PCT Pub. No.: WO2007/099062
PCT Pub. Date: Sep. 7, 2007

(65) Prior Publication Data
US 2009/0006845 A1    Jan. 1, 2009

(30) Foreign Application Priority Data

Feb. 28, 2006  (FR) .................................. 06 50692

(51) Int. Cl.
*G06F 21/00*    (2006.01)
(52) U.S. Cl.
USPC ........................................................ 380/200
(58) Field of Classification Search
None
See application file for complete search history.

(56) References Cited

U.S. PATENT DOCUMENTS

| 2002/0186844 | A1* | 12/2002 | Levy et al. | 380/231 |
| 2005/0091507 | A1  | 4/2005  | Lee et al.  |         |
| 2005/0132209 | A1* | 6/2005  | Hug et al.  | 713/189 |
| 2005/0210249 | A1  | 9/2005  | Lee et al.  |         |
| 2005/0216739 | A1  | 9/2005  | Lee et al.  |         |
| 2006/0062426 | A1* | 3/2006  | Levy et al. | 382/100 |
| 2006/0218650 | A1  | 9/2006  | Costa-Requena et al. | 726/27 |
| 2007/0061269 | A1* | 3/2007  | Dimkovic    | 705/59  |

FOREIGN PATENT DOCUMENTS

EP     1 739 913 A1    1/2007

OTHER PUBLICATIONS

PCT/ISA/237 (Written Opinion).
PCT/ISA/210 (International Search Report).

(Continued)

*Primary Examiner* — Shaun Gregory
(74) *Attorney, Agent, or Firm* — Buchanan Ingersoll & Rooney PC

(57) ABSTRACT

The invention concerns a terminal (T) comprising an agent (AS) for processing a secure content encrypted with a key (KCN) and transmitted by a first server (SCN). In order to manage a secure access to the secure content, an application (AG) of a portable communicating object, such as a chip card, associated with a terminal stores one type of related digital right (TDN) and a certificate and transmitted by the agent and stores an access right (DA) and the key (KCN) related to the secure content transmitted from a second server (SAD). The application adapts the access right and the key and modifies the secure content, based on the type of right, and produces a secure access file based on the adapted access right and the key and on the certificate, the produced file being accessible by the terminal so that the agent may process the modified content.

11 Claims, 2 Drawing Sheets

OTHER PUBLICATIONS

Figure 1:
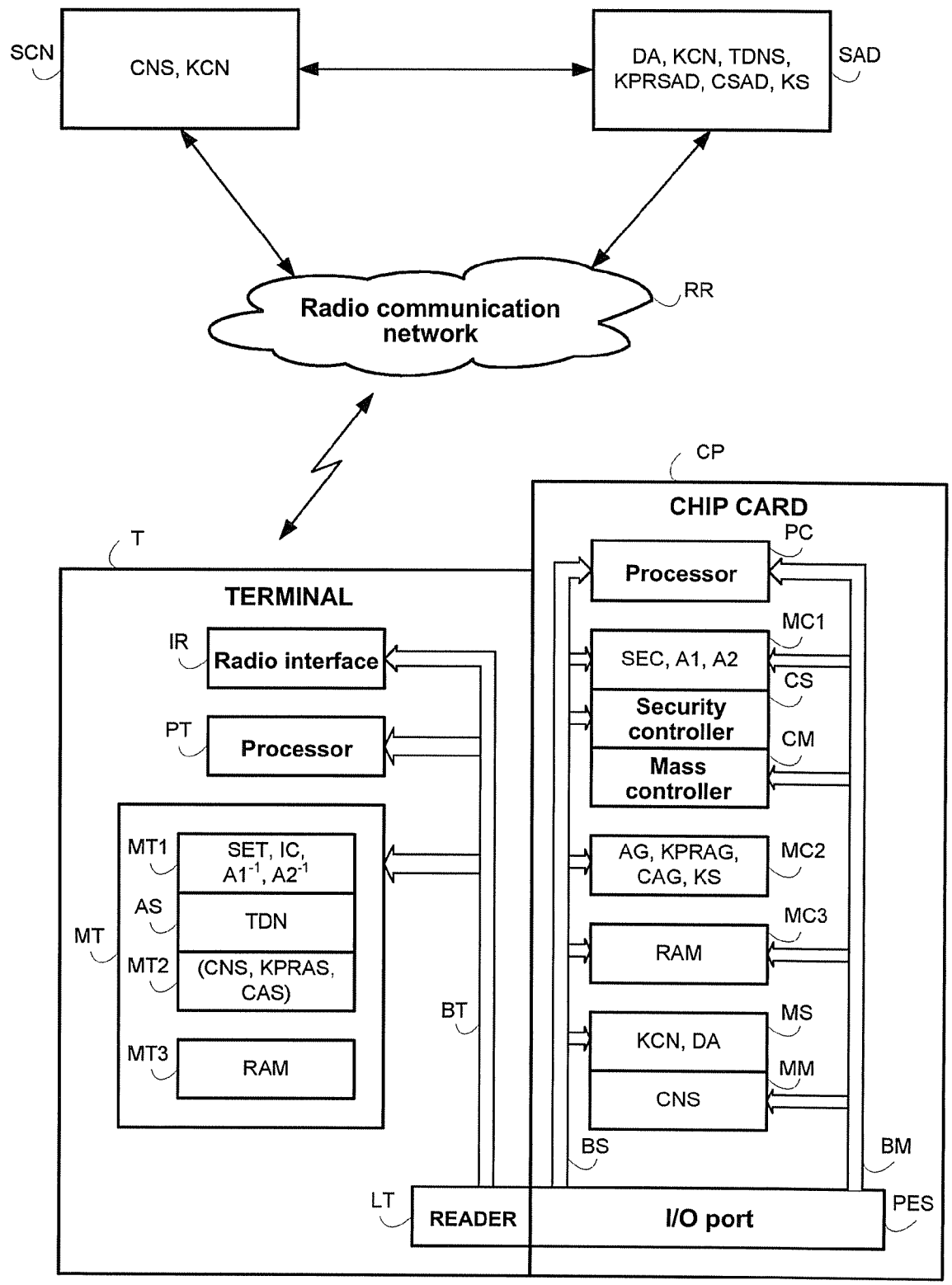

Safavi-Naini Reihaneh et al: "Import/Export in digital rights management" Proc. Fourth ACM Workshop Digit. Rights Manage.; DRM 2004: Proceedings of the Fourth ACM Workshop on Digital Rights Management; DRM 2004: Proceedings of the Fourth ACM Workshop on Digital Rights Management 2004, [Online] 2004, pp. 99-110.

Kravitz David W ER al: "Achieving media portability through local content translation and end-to-end rights management" Proc. Fifth Workshop Digi. Rights Manag.; DRM '05—Proceedings of the Fifth ACM Workshop on Digital Rights Management; DRM '05—Proceedings of the Fifth ACM Workshop on Digital Rights Management 2005, [Online] 2005, pp. 27-36.

Gelareh Taban, Alvaro A. C'Ardenas and Virgil D. Gligor: "Towards a secure and interoperable DRM architecture" Proceedings of the ACM Workshop on Digital Rights Management, [Online] Oct. 30, 2006, pp. 68-78.

* cited by examiner

MANAGEMENT OF SECURE ACCESS TO A SECURE DIGITAL CONTENT IN A PORTABLE COMMUNICATING OBJECT

The present invention concerns the management of secure access to a secure digital content in a portable communicating object associated with a terminal comprising an agent for processing the secure digital content.

At the present time, operators of radio communication networks are confronted with problems caused by the advent of the market for downloading secure digital contents.

The operator has recourse to diverse and varied systems for managing digital rights DRM ("Digital Rights Management" in English), which each have a specific digital right format for accessing and processing secure digital contents and which contribute to making the distribution of the security to the contents complex and segmented.

Digital rights management systems are incompatible with each other and do not offer solutions for storing secure digital contents and their associated access rights when the user uses a new terminal exploiting a different type of digital right from that of the old terminal. The technical problem lies in the fact that the key serving to protect the secure digital content is enciphered with the public key of a certificate of the old terminal and cannot therefore be read in the new terminal.

Conventionally, a terminal contains a software agent for processing an enciphered secure digital content transmitted by a digital content server and a secure access file transmitted by a rights administration server. The enciphered secure digital content can be downloaded freely from a secure content server. The secure access file contains an access right and a key for deciphering the secure digital content. The key is enciphered with the public key of a certificate of the agent and the secure access file is signed with a private key of the rights administration server, the latter and the agent having previously exchanged their certificates.

According to a first solution, the rights administration server revokes the certificate of the old terminal and generates a new secure access file for the new terminal. In this case, the old terminal can no longer use the secure digital content.

According to a second solution similar to the first, the old terminal returns the secure access file to the rights administration server, which generates another secure access file for the new terminal. This solution has the drawback that the old terminal must be functional and usable by the user, which is for example impossible when the old terminal is broken or stolen, or the victim of a virus annihilating the capacities of the old terminal.

According to a third solution, the software agent is implemented partly in the terminal and partly in a chip card associated with the terminal, the secure access file being linked cryptographically to the chip card. When a new terminal is associated with the chip card, a secure communication between the chip card and the software agent of the terminal must be established so that the card communicates the deciphering key for the digital content to the software agent. This solution has the following drawbacks: the software agents of the chip card and of the terminal share secret data and require a secure channel for communicating, and the types of digital right supported by the chip card and the new terminal must be compatible.

The objective of the invention is to remedy the aforementioned drawbacks by managing a secure access to a secure digital content in a manner adapted to any terminal processing the said content.

To achieve this objective, a method for managing a secure access to a secure digital content enciphered with a key in a portable communicating object associated with a terminal, the terminal comprising an agent for processing the secure digital content that is transmitted by a first server to the terminal over a communication network, is characterised in that it comprises, in the portable communicating object, the steps of:

accessing a certificate relating to the agent and a type of digital right used by the agent, storing the key and an access right relating to the secure digital content, transmitted from a second server, adapting the key and the access right received and modifying the secure digital content, according to the type of digital right accessed, and producing a secure access file according to the adapted access right, the adapted key and the accessed certificate, the secure access file being accessible to the terminal so that the agent processes the secure digital content modified according to the secure access file.

The first server, such as a digital rights administration server, can advantageously manage a single type of digital right for transmitting secure digital contents to terminals. Consequently, digital sets of access right and key are created respectively for secure digital contents according solely to the type of digital right managed by the first server. In addition, according to the steps of the method of the invention, the first server does not require knowledge of the certificate of the agent of the terminal to which the secure digital content is transmitted.

Moreover, no secure channel is required between the portable communicating object and the terminal so that the terminal agent processes the secure digital content according to the secure access file produced by the portable communicating object.

According to another characteristic of the invention, the method may also comprise the following steps, when the portable communicating object is associated with a second terminal:

accessing a certificate relating to an agent of the second terminal and a type of digital right used by the agent of the second terminal, adapting the key and access right and modifying the secure digital content, according to the type of digital right used by the agent of the second terminal, and producing a second secure access file according to the formatted access right, formatted key and certificate relating to the second terminal, the second secure access file being accessible to the second terminal so that the agent of the other terminal processes the secure digital content modified according to the second secure access file.

The portable communicating object adapts to the functionalities of the terminal with which it is associated, without communication with the first server and without recourse to the previously used terminal, the latter being able to be stolen or broken, or even used once again for processing the secure digital content.

The secure digital content is for example a game to be used on different terminals, such as a communicating mobile terminal, a personal computer or a personal assistant, or a piece of music to be listened to, for example with a personal stereo or a car radio.

Consequently, the first server transmits the key and access right only once to the user, who can continue to use the secure digital content with other terminals without having to once again procure the digital content, such as a multimedia content, and/or the associated access rights. The universal use of the secure digital content makes it possible to obtain the loyalty of the user vis-à-vis the operator managing the first server and to make dynamic the purchase of secure digital contents, the user being assured of keeping the associated rights of access to the digital contents that he has purchased.

The invention also concerns a system for managing secure access to a secure digital content enciphered with a key in a portable communicating object associated with a terminal, the terminal comprising an agent for processing the secure digital content that is transmitted by a first server to the terminal over a communication network. The system is characterised in that it comprises:

a means in the portable communicating object for accessing a certificate relating to the agent and a type of digital right used by the agent, a means in the portable communicating object for storing the key and an access right, both relating to the secure digital content, transmitted from a second server, a means in the portable communicating object for adapting the key and access right received and modifying the secure digital content, according to the type of digital right accessed, and a means in the portable communicating object for producing a secure access file according to the adapted access right, the adapted key and the accessed certificate, the secure access file being accessible to the terminal so that the agent processes the secure digital content modified according to the secure access file.

For example, the communication network is a radio communication network and the portable communicating object is a chip card associated with a mobile terminal and including a security memory for storing sensitive data such as the access right and key relating to the secure digital content.

The invention also concerns a portable communicating object, for example consisting of a chip card, for managing secure access to a secure digital content enciphered with a key, the portable communicating object being associated with a terminal, such as a mobile terminal or a fixed terminal, comprising an agent for interpreting the secure digital content that is transmitted by a first server to the terminal over a communication network. The portable communicating object is characterised in that it comprises;

a means for accessing a certificate relating to the agent and a type of digital right used by the agent, a means for storing the key and an access right both relating to the secure digital content, transmitted from a second server, a means for adapting the key and access right received and modifying the secure digital content, according to the type of digital right accessed, and a means for producing a secure access file according to the adapted access right, the adapted key and the accessed certificate, the secure access file being accessible to the terminal so that the agent processes the secure digital content modified according to the secure access file.

The invention also relates to a computer program able to be used in a portable communicating object for managing secure access to a secure digital content enciphered with a key, the portable communicating object being associated with a terminal comprising an agent for processing the secure digital content that is transmitted by a first server to the terminal through a communication network. The program is characterised in that it comprises instructions that, when the program is executed in the said portable communicating object, perform the steps according to the method of the invention.

Figure 2:
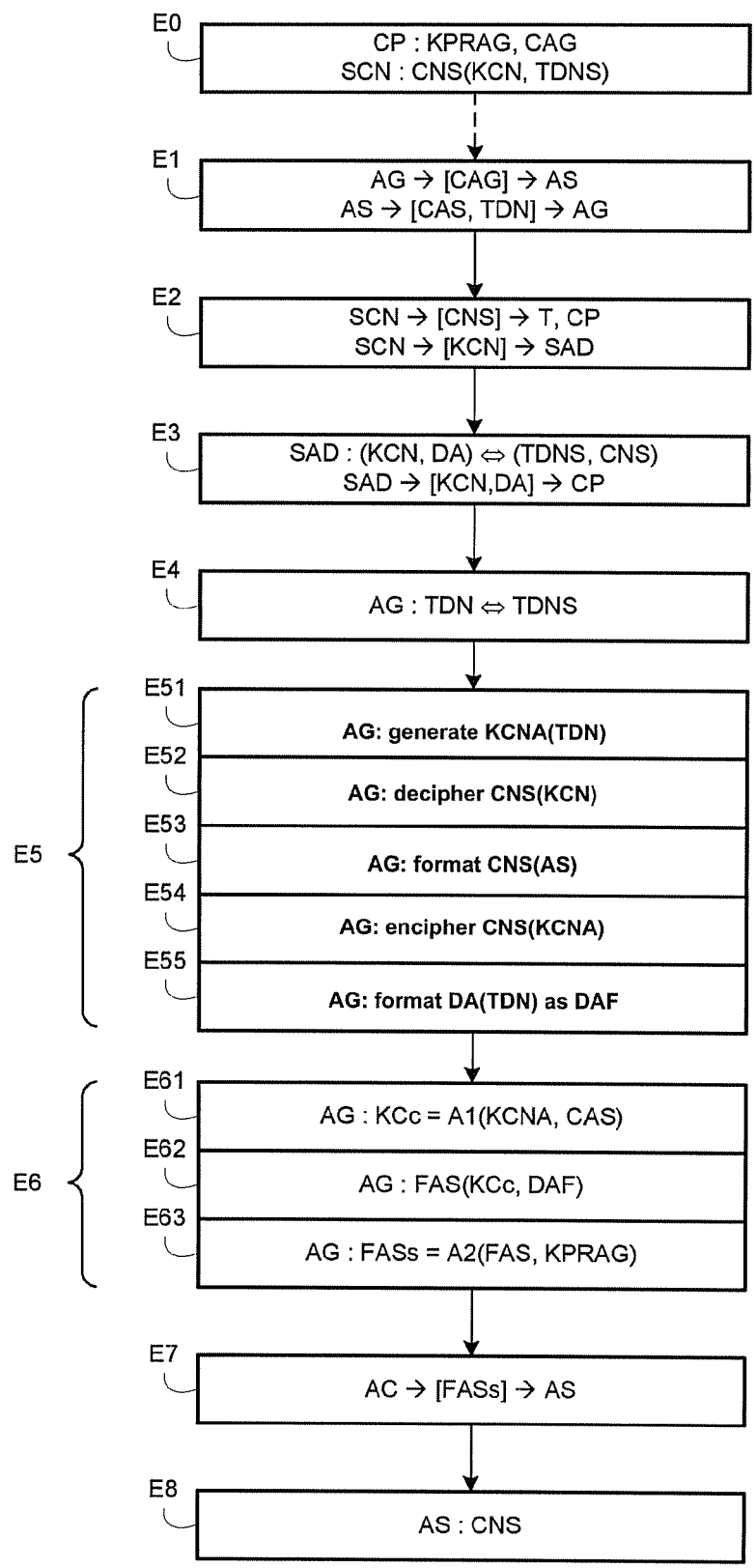

Other characteristics and advantages of the present invention will emerge more clearly from a reading of the following description of several preferred embodiments of the invention, given by way of non-limitative examples, with reference to the corresponding accompanying drawings, in which:

FIG. 1 is a schematic block diagram of a communication system according to a preferred embodiment implementing the invention, connecting a portable communicating object, a terminal and two servers; and FIG. 2 is an algorithm of a method of managing secure access to a secure digital content according to the invention.

A preferred embodiment implementing the invention described below relates to the field of radio communication networks in which data can be transmitted between a digital content server or a digital rights administration server, and a terminal associated with a portable communicating object.

With reference to FIG. 1, a communication system according to the invention comprises a digital content server SCN and a digital rights administration server SAD communicating with at least one mobile terminal T associated with a portable communicating object, such as for example a chip card CP, to which reference will be made in the remainder of the description. The servers SCN and SAD and the mobile terminal T communicate through a communication network comprising at least the radio communication network RR to which the mobile terminal T is attached. The radio communication network RR is of the UMTS type, of the GSM type back to back with a GPRS network, or of the WIFI, WIMAX or WIBRO type, or a proximity network of the infrared, Bluetooth or NFC (|Near Field Communication) type.

The four entities SCN, SAD, T and CP are represented in a form of functional blocks, the majority of which fulfil functions having a link with the invention and may correspond to software and/or hardware modules.

The digital content server SCN hosts secure digital contents CNS, in general multimedia data such as music or video files, or games, to be transmitted to terminals.

The digital content server SCN also contains enciphering keys KCN for enciphering the secure digital contents CNS according to a type of digital right TDNS managed by the digital rights administration server SAD.

In a variant, a type of digital right is managed by the digital content server SCN and transferred by the latter to the digital rights administration server SAD with a secure digital content.

The digital rights administration server SAD associates access rights DA with secure digital contents CNS defining authorisations and constraints relating to the use of the secure digital contents. The access rights DA depend on the type of digital right TDNS and no secure digital content can be used without its associated access rights.

The rights administration server SAD also contains the keys KCN used and transmitted by the digital content server SCN, a private key KPRSAD and a certificate SCAD associated with the private key. The certificate CSAD contains in particular a public key corresponding to the private key KPRSAD, an identity of the possessor of the public key, a period of validity, a list of attributes corresponding to the rights of use of the key, for example a message signature key, and a cryptographic signature for the previous data by an enciphering key of a certificating authority issuing the certificate. The certification authority, also referred to as the key management infrastructure PKI ("Public Key Infrastructure" in English), is responsible in particular for generating certificates and the associated private keys. The certification authority is for example the server SAD itself.

The digital rights administration server SAD may also contain session keys KS for communicating in a secure manner with portable communication objects, such as the chip card CP.

The servers SCN and SAD communicate with each other in a secure manner through for example the fixed part of the radio communication network RR and the internet. In a variant, the servers communicate with each other by means of dedicated lines.

Each of the servers SCN and SAD may be managed by an operator of the radio communication network RR and constitute an OTA platform ("Over The Air" in English).

In another variant, the servers SCN and SAD are merged and constitute a single server.

The chip card CP is a chip card with or without contact, for example with a high memory capacity. The chip card comprises a security unit and a mass memory unit, which are two characteristic logic units. The security unit comprises a security controller CS and a security memory MS. The mass memory unit comprises a mass memory controller CM and a mass memory MM for storing data, such as secure digital contents CNS, requiring a large amount of memory space. The security controller and the mass memory controller are preferably logic modules in a common physical component. According to another example, the controllers are integrated in distinct physical components connected together. The accesses to the memories MM and MS are distinct and respectively controlled by the controllers CS and CM. For example, the security controller CS cannot write data in the mass memory MM. Likewise, the mass memory controller CM cannot write data in the security memory MS.

The mass memory unit is entirely controlled by the terminal T, which instructs the mass memory controller CM to write, read or delete data in the mass memory MM, which prevents the security controller CS from writing in the mass memory MM. The mass memory unit has functionalities and a structure that may be similar to those of a USB (Universal Serial Bus) key, or a flash memory card (Flash-Memory Card), or a secure digital card (Secure Digital Card), or a multimedia card of the MMC (Multi Media Card) type.

The security controller CS of the security unit may be a SIM (Subscriber Identity Module) application when the associated terminal T is a mobile of the GSM or GPRS type, or a USIM (Universal Subscriber Identity Module), RUIM (Removable User Identity Module) or ISIM (IP subscriber Identity Module) application, associated with a mobile terminal functioning in code division multiple access CDMA (Code Division Multiple Access) of the third generation (3GPP) OF THE UMTS (Universal Mobile Telecommunications System) or UTRAN (UMTS Terrestrial Radio Access Network) type, or of the third generation (3GPP2) of the CDMA 2000 type. The security unit may establish, in a known manner, a communication channel of the OTA type with a distant server, such as the rights administration server SAD, in order to transmit and receive data transparently through the terminal T.

A microcontroller of the chip card CP comprises a processor PC, or several processors, and three memory areas MC1 to MC3. The card receives commands or requests from the terminal T, and transmits responses to the terminal T through an input/output port PES.

The memory MC1 is of the ROM or Flash type and includes the operating system SEC of the card, a first enciphering algorithm A1 and a second enciphering algorithm A2. The memory MC1 comprises the security controller CS of the security unit and the mass memory controller CM of the mass memory unit.

The memory MC2 is a non-volatile memory, for example EEPROM or Flash, in order in particular to store identity numbers and other parameters of the profile of the user possessing the card, such as a PIN code and other security data. The memory MC2 is only accessible through the security unit.

The memory MC2 comprises a memory space for storing card applications, such as a management application AG, which constitute applets STK, for example SIM ToolKit, and which are installed when the card is manufactured or possibly installed when the card is used at the request of the user or operator.

The memory MC2 comprises a private management application key KPRAG and a certificate CAG associated with the private key KPRAG. The private key KPRAG and the certificate CAG are respectively identical to the private key KPRSAD and to the certificate CSAD relating to the rights administration server SAD. In a variant, the private key KPRAG is distinct from the private key KPRSAD and the certificate CAG is linked to the certificate CSAD by a certification chain, in particular the certificate CAG is for example digitally signed by the private key KPRSAD. The link between the certificates CAG and CSAD ensures trust granted to the certificate CAG by the certification authority.

The memory MC2 also comprises a session key KS for communicating with the rights administration server SAD in a secure manner, if the latter is not managed by the operator of the network RR.

The security memory MS is designed to store sensitive data such as an access right DA associated with an enciphering key KCN transmitted by the rights administration SAD and with which a secure digital content CNS is enciphered.

In a variant the security memory MS comprises the content of the memory MC2.

The memory MC3 is a RAM or SRAM memory used particularly for processing data.

The mass memory MM can store secure digital contents CNS transmitted by the digital content server SCN.

The processor PC, the memory MC1, the security controller CS, the memories MC2 and MC3, the security memory MS and the port PES in the card are connected to one another by a bidirectional security bus BS.

Likewise, the processor PC, the memory MC1, the mass memory controller CM, the memory MC3, the mass memory MM and the port PES in the card are connected to one another by a bidirectional bus BM.

The terminal T comprises a processor PT, memories MT, a radio interface IR and a card reader LT for communicating with the port PES of the chip card CP.

The various elements of the terminal are connected together by a bidirectional bus BT.

The memories MT comprise three memory areas MT1, MT2 and MT3.

The memory MT1 is of the ROM or Flash type and includes the operating system SET of the terminal T and deciphering algorithms $A1^{-1}$ and $A2^{-1}$.

The memory MT1 also comprises a communication interface IC so that the main application SIM or USIM or any other application in the chip card CP communicates with the "outside world" via the terminal T, for example with the rights administration server SAD. The communication interface IC manages commands and responses exchanged between the "outside world" and an application of the chip card, for example to adapt them to communication over a data channel, for example according to the TCP protocol, or to adapt them to short messages exchanged with a short message server of the network RR and packeting data transmitted and received by the server SAD.

The memory MT2 is a non-volatile memory, for example EEPROM or Flash, and may comprise among other things a private security agent key KPRAS and a certificate CAS associated with the private key KPRAS.

The memory MT2 may also comprise a secure digital content CNS.

The memory MT3 is a RAM or SRAM memory used particularly for processing data.

The terminal T comprises, also in relation to the invention, a security agent AS, which may be a software agent, distributed in the memories MT1 and MT2. The security agent AS analyses the access rights DA associated with secure digital contents CNS and deciphers the secure digital contents CNS with the corresponding keys KCN. The security agent AS is typically a media reader.

The security agent AS uses at least one type of digital right TDN that is specific to the agent AS and depends for example on a choice of the manufacturer of the terminal T, the operator or the user of the terminal. One type of digital right TDN defines for example the type of a key KCN for enciphering secure digital contents or the length of the said key, and the format of the access right DA associated with the secure digital content CNS.

The security agent AS can also be integrated in a personal computer connected to the terminal T associated with the chip card CP.

According to other examples, the terminal T is replaced by any terminal with which a chip card can communicate and may be a portable message transmission device, or a personal computer (PC) provided with a chip card reader. The network RR may then be coupled for example to an intranet, a local wireless network or the internet.

With reference to FIG. 2, the method of managing secure access to a secure digital content according to a preferred embodiment of the invention comprise steps E1 to E8.

Initially, at a step E0, in the chip card CP, there are stored the private management application KPRAG and a certificate CAG associated with the private key KPRAG in a secure memory solely accessible to the management application AG, for example in the memory MC2 or MS. In addition, the rights administration server SAD manages a predefined type of digital right TDNS and the digital content server SCN has enciphered secure digital contents CNS with an enciphering key KCN in a manner compatible with the type of digital right TDNS selected in agreement with the rights administration server SAD.

At step E1, a communication is established between the management application AG of the chip card CP and the security agent AS of the terminal T. The security agent AS accesses the certificate CAG made available by the management application AG. Likewise, the management application AG accesses the certificate CAS and the type of digital right TDN used by the agent AS, made available by the latter.

Preferably, the management application AG transmits the certificate CAG to the security agent AS on the one hand, and the security agent AS transits the certificate CAS and the type of digital right TDN used by the agent AS to the management application AG on the other hand. The certificates and the type of digital right are for example transmitted when the terminal is started up by means of a communication of the ATR (Answer to Reset) type or of the terminal profile type during which the terminal T is informed of the capacities of the chip card CP or vice versa. The certificate CAS and the type of digital right TDN received by the management application AG are for example stored in the security memory MS.

In a variant, the certificates and the type of digital right are respectively written in files accessible to the management application AG and to the security agent AS.

In another variant, the certificates and the digital right type are exchanged between the management application and the security agent by means of the rights administration server SAD.

In more general terms, the certificates and the digital right type can be transmitted via proprietary or standardised commands and protocols between the management application AG and the security agent AS.

In a variant, the step E1 can be executed after step E2 or E3 and before step E4.

At step E2, the user of the terminal T wishes to acquire a secure digital content CNS that he has for example selected on an internet site hosted by the digital content server SCN. The server SCN transmits the secure digital content CNS enciphered with the enciphering key KCN to the terminal T, the key KCN being associated with the digital right type TDNS managed by the rights administration server SAD. The secure digital content CNS is stored in a high-capacity memory accessible to the security agent AS, for example in the mass memory MM of the chip card CP or in the memory MT2 of the terminal T.

The secure digital content CNS can be made available without constraint since it is accessible and usable only with the access right DA that is associated with it. The terminal T can therefore recover the secure digital content CNS directly from any point of sale or by successive transfers from other terminals in relationship with the digital content server SCN.

Following the transmission of the secure digital content CNS to the terminal T, the digital content server SCN transmits the enciphering key KCN to the rights administration server SAD.

At step E3, the rights administration server SAD transmits to the chip card CP the enciphering key KCN and the access right DA both associated with the secure digital content CNS and relating to the digital right type TDNS managed by the server SAD. The chip card CP stores the enciphering key KCN and the access right DA received in a secure memory space only accessible to the management application AG, for example in the security memory MS. The enciphering key KCN and the access right DA are transmitted to the chip card generally when the user of the terminal T has made a transaction for the purchase of or the intention to purchase the content CNS.

Preferably, the enciphering key KCN and the access right DA are transmitted by the rights administration server SAD to the chip card by short message via a platform OTA of the network RR and via the communication interface IC of the terminal T.

If the rights administration server SAD is not managed by the operator of the network RR, the enciphering key KCN and the access rights DA are enciphered by the session key KS known to the application AG of the chip card CP.

In a variant, the enciphering key KCN and the access right DA are transmitted in a secure manner, for example by virtue of the key KS, and stored in the chip card CP directly from a point of sale.

In another variant, the rights administration server SAD transmits to the management application AG digital sets each containing an enciphering key and an access right both relating to respective types of access right so that the management application AG selects the enciphering key and the access right associated with the digital right type TDN used by the security agent AS.

In another variant, the enciphering key KCN is a conventional key compatible with all the types of access right used by the terminal manufacturers. In this case, the rights administration server SAD transmits to the management application AG the key KCN and the access right DA, or the key KCN and the access rights DA relating to the various types of access right.

At step E4, the management application AG checks whether the digital right type TDNS associated with the enciphering key KCN and with the access right DA received correspond to the digital right type TDN used by the security agent AS and transmitted by the latter at step E1.

If the access right types TDS and TDNS are different, in other words if the enciphering key KCN and the access right DA received are not compatible with the digital right type TDN used by the agent AS, at step E5 the management application AG adapts the enciphering key KCN and the access right DA and modifies the secure digital content CNS according to the digital right type TDN used by the security agent AS according to steps E51 to E55.

At step E51, the management application AG generates an enciphering key KCNA adapted to the digital right type TDN used by the security agent AS.

At step E52, the management application AG deciphers the secure digital content CNS with the enciphering key received KCN, and according to an algorithm associated with the key KCN, At step E53, the management application AG formats the deciphered secure digital content CNS in a manner compatible with the security agent AS. The format of the secure digital content is then adapted to the agent AS so that the latter interprets it. For example, the secure digital content contains headers whose syntax is formatted so that the headers, and consequently the secure digital content, are legible to the security agent.

In a variant, step E53 is not executed if the deciphered secure digital content CNS can be interpreted by the security agent AS.

At step E54, the management application AG once again enciphers the deciphered and formatted secure digital content CNS with the adapted enciphering key KCNA, and according to an enciphering algorithm associated with the key KCNA.

At the end of steps E52 to E54, the secure digital content CNS is considered to be modified following the successive deciphering, formatting and enciphering thereof.

At step E55, the management application AG formats the access right DA as a formatted access right DAF in a manner compatible with the digital right type TDN. For example, the formatted access right DAF is an XML-type file (eXtensible Markup Language), the tags of which must be legible to the security agent AS. The management application AG then adapts the syntax of the tags to the access right format defined by the digital right type TDN.

Step E55 can be executed before one of steps E51 to E54.

In a variant, the enciphering key KCN is a conventional key compatible with all the access right types TDN used by the terminal manufacturers. In this case, only the access right DA received is not compatible with the digital right type TDN and the management application AG adapts only the access right DA in a manner compatible with the digital right type TDN. If the secure digital content CNS is not compatible with the security agent AS, it is deciphered with the key KCN at step E2, formatted in a manner compatible with the security agent AS at step E3 and enciphered once again with the enciphering key KCN, step E51 not being executed.

In another variant, the enciphering key KCN is a conventional key compatible with the various types of access right TDN exploited by the terminal manufacturers and several access rights, including the access right DA, relating to the various types of access right have been transmitted by the server SAD and stored in the chip card. The access right DA is considered to be adapted to step E55 by selecting a received access right compatible with the access right type used by the security agent.

In yet another variant, digital sets each containing an enciphering key and an access right both relating to respective types of access right, in particular the key KCN and the access right DA, have been transmitted by the server SAD and stored in the chip card. The key KCN and the access right DA are considered to be adapted to step E5 by selecting, from the digital sets, the enciphering key and access right compatible with the digital right type TDN used by the security agent AS.

Returning to step E4, if the types of access right TDN and TDNS are identical, the access right DA and the key KCN being interpretable by the agent AS are considered to be adapted to step E5.

The management application AG produces a secure access file FAS, preferably signed as a file FASs, according to the adapted key KCNA and the formatted access right DAF, according to step E6 comprising steps E61 to E63.

At step E61, the management application AG applies to the adapted enciphering key KCNA the first algorithm A1 having as its key the public key of the certificate CAS in order to produce an enciphered enciphering key KCc.

At step E62, the management application AG produces a secure access file FAS comprising the enciphered enciphering key KCc and the formatted access right DAF compatible with the digital right type TDN.

At step E63, the management application AG signs the secure access file FAS with the key KPRAG. More precisely, the management application AG applies the secure access file FAS to the second algorithm A2 having as its key the private management application key KPRAG in order to produce the signed secure access file FASs.

Consequently, since the certificate CAS and the digital access type TDN relating to the terminal are known to the management application, the chip card adapts to the terminal with which it is associated.

At step E7, the management application AG makes the signed secure access file FASs accessible to the security agent AS.

For example, the signed secure access file FASs is stored in a file system defined by the specification ISO 7816-4 of the chip card or in a system of files of the FAT type of a flash memory of the chip card.

According to another example, the signed secure access file FASs is accessible to the security agent AS via a protocol of the HTTP type (HyperText Transfer Protocol) or any other proprietary or standardised protocol, such as the rights acquisition protocol ROAP (Right Object Acquisition Protocol).

According to another example, the way in which the security agent AS accesses the signed secure access file FASs results from a negotiation between the security agent AS and the management application AG comprising an exchange of information on the possibilities of communication protocols usable by the security agent AS and by the management application AG.

At step E8, the security agent AS processes the secure digital content CNS according to the secure access file FASs. The security agent AS validates the signed secure access file FASs with the certificate CAG, using the deciphering algorithm $A2^{-1}$ that is the inverse of the second algorithm A2, and deciphers the enciphered key KCc with the private key KPRAS as a deciphered key that is the key KCNA using the deciphering algorithm $A1^{-1}$ that is the inverse of the first algorithm A1. The security agent AS then interprets the formatted access right DAF and deciphers the secure digital content CNS with the deciphered key KCNA. Once deciphered, the secure digital content CNS can then be read by a media reader associated with the security agent AS.

When the user uses a second terminal with the chip card, the secure digital content CNS and the associated secure access file FAS are updated in order to be interpreted by the security agent AS of the second terminal.

When the user decides to change terminal, he removes the chip card CP from the old terminal T and acquires the second terminal, in which the user inserts the chip card CP, which is then connected to the second terminal.

The secure digital content CNS previously received is accessible to the management application AG. It is for example stored in the chip card CP or copied from the old terminal into the acquired second terminal.

In a similar manner to step E1, the management application AG and the security agent AS exchange information relating to the certificate CAG, to the certificate CAS and to the digital right type TDN used by the agent AS.

In a similar manner to steps E4 and E5, the management application AG adapts the enciphering key KCN and the access right DA and modifies the secure digital content CNS according to the digital right type TDN used by the security agent AS of the second terminal.

In a similar manner to step E6, the management application AG produces a second secure access file FAS, preferably signed FASs, according to the formatted access right DAF, the adapted key KCNA and the certificate CNS all relating to the second terminal, so that only the security agent AS of the second terminal can decipher and process the secure digital content CNS according to the second secure access file FASs.

The secure digital content CNS is advantageously recovered only once by the user of the chip card CP, as described at step E2, and the enciphering key KCN and the access right DA both relating to the secure digital content CNS are also transmitted only once by the rights administration server SAD to the chip card CP, as described at step E3.

Consequently the user can use the chip card CP with any other terminal, since it keeps in memory the enciphering key KCN and the access right DA and adapts to the functionalities of the terminal in which it is inserted. Moreover, the user can once again use the chip card CP with the old terminal so that the latter reads the secure digital content.

The invention is not limited to the field of telecommunications. The portable communicating object can be a USB (Universal Serial Bus) key for exchanging confidential data stored in the mass memory of the USB key whose secure access is managed by the security unit of the USB key.

According to another example of implementation of the invention, the rights administration server SAD may be a personal computer (PC) connected to the terminal T by a cable connection of the serial link or USB link type or by a wireless connection of the Bluetooth, WIFI, infrared (IrDA: Infrared Data Association) or ZigBee type.

According to yet another example of implementation of the invention, a personal computer (PC) serves as a gateway between the rights administration server SAD and/or the digital content server SCN and the terminal. The server SCN and/or the server SAD communicate with the computer via a communication network of the internet type, and the computer communicates with the terminal via a wireless connection of the Bluetooth, WIFI, infrared (IrDA: Infrared Data Association) or ZigBee type.

Instead of being mobile, the terminal may be a fixed terminal, such as a personal computer, associated with the portable communicating object and communicating with the servers SCN and SAD via the internet in particular.

The invention described here concerns a method and a portable communicating object for managing secure access to a secure digital content CNS enciphered with a key KCN, the portable communicating object CP being associated with a terminal T comprising an agent AS for processing the secure digital content that is transmitted by a first server SCN to the terminal through a communications network RR. According to a preferred implementation, the steps of the method of the invention are determined by the instructions of a computer program incorporated in the portable communicating object such as a chip card CP. The program contains program instructions which, when the said program is executed in the portable communicating object, whose functioning is then controlled by the execution of the program, perform the steps of the method according to the invention.

Consequently the invention also applies to a computer program, in particular a computer program on or in an information carrier, adapted to implement the invention. This program may use any programming language and be in the form of source code, object code or intermediate code between source code and object code such as in a partially compiled form, or in any other form desirable for implementing the method according to the invention.

The invention claimed is:

1. A method for managing secure access to a secure digital content enciphered with a key in a portable communicating object associated with a terminal, the terminal comprising an agent for processing the secure digital content that is transmitted by a first server to the terminal through a communications network, said method comprising the following steps executed, in the portable communicating object:
   accessing a certificate relating to the agent and a type of digital right used by the agent,
   storing the key and an access right relating to the secure digital content, transmitted from a second server,
   comparing the type of digital right used by the agent and the received access right relating to the secure digital content,
   adapting the key and the received access right and modifying the secure digital content, according to the type of digital right used by the agent, if the type of digital right used by the agent and the received access right relating to the secure digital content are different, and
   producing a secure access file according to the adapted access right, the adapted key and the accessed certificate, the secure access file being accessible to the terminal so that the agent processes the secure digital content modified according to the secure access file, if the type of digital right used by the agent and the received access right relating to the secure digital content are different.

2. A method according to claim 1, wherein the adapting and modifying step also comprises, in the portable communicating object, the steps of:
   generating a key adapted to the digital right type,
   deciphering the secure digital content with the key, and
   enciphering the deciphered secure digital content with the generated key.

3. A method according to claim 2, wherein the adapting and modifying step also comprises, in the portable communicating object, a formatting of the deciphered secure digital content in a manner compatible with the security agent, so that the formatted secure digital content is enciphered with the generated key.

4. A method according to claim 1, also comprising the steps of:
   accessing from the agent a second certificate relating to the portable communicating object, in the portable communicating object, signing the secure access file with a private key relating to the second certificate so that the agent validates the signed secure access file with the second certificate.

5. A method according to claim 1, wherein the secure access file comprises an enciphered key and the adapted access right, the enciphered key being produced by applying the adapted key to an algorithm whose key is a public key of the certificate relating to the agent.

6. A method according to claim 1, also comprising, when the portable communicating object is associated with a second terminal, the steps of:
    accessing a certificate relating to an agent of the second terminal and a type of digital right used by the agent of the second terminal,
    adapting the key and access right and modifying the secure digital content, according to the type of digital right used by the agent of the second terminal, and
    producing a second secure access file according to the formatted access right, formatted key and certificate relating to the second terminal, the second secure access file being accessible to the second terminal so that the agent of the other terminal processes the secure digital content modified according to the second secure access file.

7. A system for managing secure access to a secure digital content enciphered with a key in a portable communicating object associated with a terminal, the terminal comprising an agent for processing the secure digital content that is transmitted by a first server to the terminal over a communication network, the system comprising:
    a means in the portable communicating object for accessing a certificate relating to the agent and a type of digital right used by the agent,
    a means in the portable communicating object for storing the key and an access right, both relating to the secure digital content, transmitted from a second server,
    a means in the portable communicating object for comparing the type of digital right used by the agent and the received access right relating to the secure digital content,
    a means in the portable communicating object for adapting the key and the received access right and modifying the secure digital content, according to the type of digital right used by the agent, if the type of digital right used by the agent and the received access right relating to the secure digital content are different, and
    a means in the portable communicating object for producing a secure access file according to the adapted access right, the adapted key and the accessed certificate, the secure access file being accessible to the terminal so that the agent processes the secure digital content modified according to the secure access file, if the type of digital right used by the agent and the received access right relating to the secure digital content are different.

8. A system according to claim 7, in which the communication network comprises a radio communication network.

9. A portable communicating object for managing secure access to a secure digital content enciphered with a key, the portable communicating object being associated with a terminal, comprising an agent for interpreting the secure digital content that is transmitted by a first server to the terminal over a communication network, and further comprising:
    a means for accessing a certificate relating to the agent and a type of digital right used by the agent,
    a means for storing the key and an access right both relating to the secure digital content, transmitted from a second server,
    a means for comparing the type of digital right used by the agent and the received access right relating to the secure digital content,
    a means for adapting the key and the received access right and modifying the secure digital content, according to the type of digital right used by the agent, if the type of digital right used by the agent and the received access right relating to the secure digital content are different, and
    a means for producing a secure access file according to the adapted access right, the adapted key and the accessed certificate, the secure access file being accessible to the terminal so that the agent processes the secure digital content modified according to the secure access file, if the type of digital right used by the agent and the received access right relating to the secure digital content are different.

10. A portable communicating object according to claim 9, wherein said portable communicating object comprises a chip card.

11. A non-transitory computer-readable medium having encoded thereon a computer program able to be used in a portable communicating object for managing secure access to a secure digital content enciphered with a key, the portable communicating object being associated with a terminal comprising an agent for processing the secure digital content that is transmitted by a first server to the terminal through a communication network, the program comprising instructions that, when the program is executed in said portable communicating object, performs the steps of:
    accessing a certificate relating to the agent and a type of digital right used by the agent,
    storing the key and an access right both relating to the secure digital content, transmitted from a second server,
    comparing the type of digital right used by the agent and the received access right relating to the secure digital content,
    adapting the key and the received access right and modifying the secure digital content, according to the type of digital right used by the agent, if the type of digital right used by the agent and the received access right relating to the secure digital content are different, and
    producing a secure access file according to the adapted access right, the adapted key and the accessed certificate, the secure access file being accessible to the terminal so that the agent processes the secure digital content modified according to the secure access file, if the type of digital right used by the agent and the received access right relating to the secure digital content are different.

* * * * *